United States Patent [19]

Yanus

[11] Patent Number: 4,523,035

[45] Date of Patent: Jun. 11, 1985

[54] PROCESS FOR SYNTHESIZING SQUARAINE COMPOSITIONS

[75] Inventor: John F. Yanus, Webster, N.Y.

[73] Assignee: Xerox Corporation, Stamford, Conn.

[21] Appl. No.: 557,801

[22] Filed: Dec. 5, 1983

[51] Int. Cl.³ .................. C07C 85/00; C07C 85/02; C07C 85/06
[52] U.S. Cl. .................................................. 564/307
[58] Field of Search ........................................ 564/307

[56] References Cited

U.S. PATENT DOCUMENTS

| 3,824,099 | 7/1974 | Champ et al. | 96/1.5 |
|---|---|---|---|
| 4,123,270 | 10/1978 | Heil et al. | 96/1.5 |
| 4,353,971 | 10/1982 | Chang et al. | 430/58 |

OTHER PUBLICATIONS

White et al., "J.A.C.S.", 86, pp. 453-458, 2/1964.
Loutfy et al., "Photoconductivity of Organic Particle Dispersions: Squaraine Dyes", Photographic Science and Engineering, vol. 27, No. 1, Jan./Feb., 1982, pp. 5-9.
USSN, 557, 795, John F. Yanus, filed 12/5/83.
USSN, 557, 796, Kock Yee Law, filed 12/5/83.

*Primary Examiner*—Paul F. Shaver
*Attorney, Agent, or Firm*—Peter H. Kondo; John E. Beck; Ronald Zibelli

[57] ABSTRACT

A process for synthesizing a squariane composition comprising forming a mixture comprising squaric acid, a long chain primary alcohol and a tertiary amine and heating the mixture in vacuo below the boiling points of the primary alcohol and the tertiary amine to form the squariane composition.

10 Claims, No Drawings

PROCESS FOR SYNTHESIZING SQUARAINE COMPOSITIONS

BACKGROUND OF THE INVENTION

This invention relates in general to an improved process, and more specifically, to an improved process for preparing squaraine compositions of matter.

Squaraine compositions are useful for incorporation into photoresponsive devices to extend the capability of such devices to be responsive to visible light as well as infrared illumination. These photoresponsive devices can therefore be utilized, for example, in conventional electrophotographic copiers as well as in laser printers. These photoresponsive devices may comprise single or multilayered members which employ photoconductive materials comprising squaraine compositions in a photogenerating layer, between a photogenerating layer and a hole transport layer, or between a photogenerating layer and a supporting substrate.

Photoconductive imaging members containing certain squaraine compositions, including amine derivatives of squaric acid, are known. Also known are layered photoresponsive devices containing photogenerating layers and transport layers, as described, for example in U.S. Pat. No. 4,123,270. Examples of photogenerating layer compositions disclosed in this patent include 2,4-bis-(2-methyl-4-dimethylamino-phenyl)-1,3-cyclobutadiene-diylium-1,3-diolate, 2,4-bis-(2-hydroxy-4-dimethylamino-phenyl)-1,3-cyclobutadiene-diylium-1,3-diolate, and 2,4-bis-(p- dimethylamino-phenyl)-1,3-cyclobutadiene-diylium-1,3-diolate. Numerous photosensitive squaraine compositions are also disclosed in U.S. Pat. No. 3,824,099. Some of the squaraine compositions in this patent comprise tertiary amines.

In a copending application entitled Processes for the Preparation of Squaraine Compositions, U.S. Ser. No. 557,796, filed in the name of Kock Yee-Law concurrently herewith, a dialkyl squarate and a dialkyl aniline, in the presence of an acid catalyst, are reacted at a temperature of from about 80° C. to 160° C. Solvents, such as aliphatic alcohols, including methanol, ethanol, propanol, butanol, especially water saturated 1-butanol, amyl alcohol, are selected for the purpose of forming a solution of the squarate and the acid.

In a copending application entitled Novel Squaraine Systems, U.S. Ser. No. 557,795, filed in the name of John F. Yanus concurrently herewith, squaric acid, a first tertiary amine and a second tertiary amine different from the first tertiary amine are reacted in the presence of a long chain primary alcohol having a boiling point between about 130° C. and about 210° C. An acid catalyst may also be present during the reaction.

While the above processes for preparing squaraine compositions may be suitable for their intended purposes, there continues to be a need for other processes wherein novel squaraine compositions, useful as photoconductive materials, can be prepared with higher yields in less time. Additionally, there remains a need for simple, economical processes for preparing squaraine compositions wherein the resulting squaraine products exhibit excellent photoreceptor dark decay and photosensitivity properties.

SUMMARY OF THE INVENTION

It is therefore an object of the present invention to provide improved processes for preparing squaraine compositions.

It is another object of the present invention, to provide improved an processes for preparing certain squaraine compositions with enhanced photosensitivity, excellent dark decay properties, and acceptable charge acceptance.

It is yet another object of the present invention to provide a simpler, more rapid, more economical and higher yield process for preparing certain squaraine compositions.

It is still another object of the present invention to provide improved processes for preparing certain squaraine compositions in which competeing reactions are avoided or minimized.

It is another object of the present invention, to provide improved readily scaleable processes for preparing certain squaraine compositions.

These and other objects of the present invention are generally accomplished by synthesizing a squaraine composition comprising providing a mixture comprising squaric acid, a primary alcohol having a boiling point between about 130° C. and about 210° C. and a tertiary amine and heating the mixture in vacuo below the boiling points of the primary alcohol and the tertiary amine to form the squaraine composition. More specifically, the process of the present invention includes reacting at a temperature of from about 60° C. and about 130° C. A pressure of between about 5 torr and about 200 torr may be used for the synthesis. If desired, a strong acid may be introduced into the solution prior to the heating of the solution.

The tertiary amine reactant may be selected from a wide variety of suitable materials. Typical tertiary amines include triaryl amines such as triphenyl amine, N,N'-diphenyl-N,N'-bis(3-methyl phenyl)-(1,1'-biphenyl)-4,4-diamine, N,N'-diphenyl-N,N'-bis(4-methylphenyl)-1,1'-biphenyl)-4,4'-diamine, heterocyclic amines such as N-ethylcarbazole, and the like.

Preferred tertiary amines include tertiary aniline derivatives having the formula:

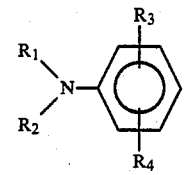

wherein $R_1$ and $R_2$ are independently selected from the group consisting of an alkyl radical having from 1 to 4 carbon atoms, phenyl, benzyl and substituted benzyl derivatives and $R_3$ and $R_4$ are independently selected from the group consisting of H, $CH_3$, $CH_2CH_3$, $CF_3$, F, Cl, Br and COOH. Tertiary aniline derivatives are preferred because undesirable size reactions are minimized. Typical tertiary aniline derivatives include N,N-dimethylaniline, N,N-diethylaniline, N,N-dipropylaniline, N,N-dibutylaniline, N,N-dipentylaniline, N,N-dihexylaniline, 3-methyl-N,N-dimethylaniline, 3-fluoro-N,N-dimethylaniline, 3-ethyl-N,N-dimethylaniline, 3-chloro-N,N-dimethylaniline, 2-fluoro-N,N-dimethylaniline, 2-methyl-N,N-dimethylaniline, 2-trifluoromethane-N,N-dimethylaniline, 2-α,α,α-trifluoromethyl-N,N- dimethylaniline, N,N-dimethylamino- 3-fluorobenzene, N-methyl-N-ethyl-3-fluoroaniline, N,N-diethyl-3-fluoroaniline, N,N-dibenzyl-3-fluoroaniline, N-methyl-N-benzyl- 3-fluoroaniline, N,N-di(4-chlorophenylmethyl)-3-fluoroaniline and the like. Optimum results are obtained with N,N-dimethylaminobenzene as one of the tertiary amine reactants.

The squaric acid reactant is also known as 1,2-dihydroxy-3,4- cyclobutenediol.

A primary alcohol having a boiling point at atmospheric pressure between about 130° C. and about 210° C. should be employed to form the reaction mixture of squaric acid and tertiary amine reactants. Typical alcohols having boiling points within this range include pentanol, hexanol, heptanol, octanol, nonanol, decanol, branched primary alcohols such as 2-ethyl-1-hexanol, and alcohol mixtures such as Soltrol 130 ® ( a mixture of branched aliphatic hydrocarbons $C_{11}$–$C_{13}$ having a boiling point of approximately 175°–180° C., available from Phillips Chemical Co.). 1-heptanol and 2-ethyl-1-hexanol are preferred because the squaraine synthesis reaction can be more readily scaled up with reduced competive reactions. Since the reaction is carried out under vacuum, improved results are achieved with a greater difference in boiling point between water and the alcohol. The more volatile water separates much more readily from heptanol than from butanol. Moreover, the solubility of water in heptanol is much less than butanol. Also, there are reduced side reactions because the larger heptanol molecule is less likely to form the diester than butanol. The boiling point of heptanol is 176° C. Since the reaction involves removal of water/alcohol during refluxing, the boiling point of the alcohol must normally be less than the boiling point of the tertiary amine, e.g. the boiling point of dimethyl aniline is 193° C. However, if a mixture of alcohols are used, at least one of the alcohols in the mixture should have a boiling point between about 130° C. and about 210° C. and have a boiling point less than the boiling point of the tertiary amine. Sufficient long chain aliphatic alcohol having a boiling point between about 130° C. and about 210° C. should be present in the reaction mixture to maintain the desired pressure and temperature during refluxing. A long chain aliphatic alcohol having a boiling point between about 170° C. and about 185° C. is preferred because the higher reaction temperatures drive off the water more rapidly without exceeding the boiling point of the tertiary amine. Secondary alcohols provide poor yields and teriary alcohols fail to provide any reaction product at all.

Alcohol solvents, such as lower boiling point aliphatic alcohols such as methanol, ethanol, propanol, butanol, 1-butanol, amyl alcohol are to be avoided in the process of this invention because of side reactions, high solubility of water in these alcohols and poor yields. For example, no yield is obtained with butanol/benzene or butanol/toluene solvents for reaction batches of 0.5 mole or greater.

The reaction may, if desired, be carried out in the presence of any suitable strong acid. Typical strong acids include various inorganic acids and organic acids such as sulfuric acid, trichloroacetic acid, dichloroacetic acid, trichloroacetic acid, oxalic acid, 2,2,2-trifluoroethanol, toluene sulfonic acid, and the like. Sulfuric acid and trichloroacetic are preferred. Excellent results have been obtained with trichloroacetic acid at a $pK_a$ of about 2.85. Generally, satisfactory results are obtained with a pka of less than about 3 to 4. The dark decay of the squaraine reaction product is improved when a strong acid is employed. Surprisingly, substituted anilines having groups such as F, Cl, Br, COOH, and $CF_3$ form squaraine pigments with low dark decay and high sensitivity when a strong acid is present in the reaction. These squaraine pigments possesss an altered structure as indicated by elemental analysis which shows a very low content of 3-F, 3-Cl, 3-Br, 3-COOH and 2-$CF_3$ substituted anilines.

The reaction temperature and pressure can vary over a relatively wide range, and is generally dependent on the alcohols and tertiary amines used. The reaction temperature and pressure should be regulated to prevent boiling of the primary alcohol and tertiary amine. Depending upon the materials employed, the reaction temperature is generally maintained between about 60° C. and about 130° C. and the pressure is generally maintained between about 5 torr and about 200 torr. Thus, for example, the pressure is normally held at about 10 torr at about 75° C. and held at about 43 torr at about 110° C. when 2-ethyl-1-hexanol is used.

The reaction times are generally dependent on the reaction temperature, solvent and tertiary amine used. For example, in preparing bis(4-dimethylaminophenyl) squaraine, reaction times of 4 hours at 105° C., 16 hours at 95° C., and 40 hours at 75° C. may be utilized.

The reaction is conducted with refluxing and the water formed during the reaction may be removed by conventional techniques such as a Dean-Stark trap.

The proportion of reactants, prmary alcohol, and acid employed is not critical and depends upon a number of factors including, for example, the specific reactants used, the pressure, and the reaction temperature. Generally, however, satisfactory results may be achieved by utilizing with 1 mole of squaric acid, about 2 moles to about 2.4 moles of tertiary amine, and from about 2 liters to about 12 liters of primary alcohol, particularly for tertiary amines having similar reaction rates with squaric acid. However, where the different tertiary amines in a given reaction mixture have vastly different reaction rates with squaric acid, a greater proportion of the less reactive tertiary amine may be used. As indicated above, a strong acid may also be added to the reaction mixture. For example, excellent results have been achieved with between about 2 liters and about 12 liters of 2-ethyl-1-hexanol per mole of squaric acid. Generally, it is desirable to minimize the amount of solvent used to minimize the amount of solvent that must be filtered off after completion of the reaction. However, when the proportion of solvent to squaric acid is reduced below about 2 liters of primary alcohol to 1 mole of squaric acid, stirring becomes more difficult.

Preferably, all reactants are added at about the same time. Yields are reduced by as much as about 10 percent when squaric acid is dissolved before addition of the amines.

The resulting product may be separated from the reaction mixture by conventional techniques, such as filtration, washed with any suitable washing liquid such as methanol, ethanol, acetone and the like and dried by conventional means such as oven driers.

The reaction products were identified primarily by melting point data, infrared analysis, and visible absorption spectroscopy. Also, elemental analysis for the respective substituents, such as analysis for carbon, hydrogen, nitrogen, and fluorine was performed. The data generated from analysis was compared with the data available for identical compounds prepared from squaric acid reactions processes using lower alcohol solvents and compared with the data available for identical compounds prepared from squarate reactions.

Illustrative examples of specific squaraine compositions resulting from the process of the present invention include bis(4-dimethylaminophenyl) squaraine, bis(4-diethylaminophenyl) squaraine, bis(2-fluorodimethylaminophenyl) squaraine, bis(2-fluorodiethylaminophenyl) squaraine, bis(2-methyl-4-dimethylaminophenyl) squaraine, bis(3-fluorodimethylaminophenyl) squaraine, bis(2-chlorodimethylaminophenyl squaraine, bis(2-bromodimethylaminophenyl) squaraine, bis(4-dimethylamino-2-fluorophenyl) squaraine, bis(4-[N,N,diethylamino-2-fluorophenyl]) squaraine, bis(4-[N-methyl-N-ethyl-2-fluoroaniline]) squaraine, bis(4-[N,N-dibenzyl-2-fluoroaniline]) squaraine, bis(4-[N-methyl-N-benzyl-2-fluoroaniline]) squaraine, bis(4-[N-ethyl-N-benzyl-2-fluoroaniline]) squaraine, bis(4-[N,N-di(4-chlorophenyl-methyl)-2- flurorphenyl]) squaraine, bis(4-[N-methyl-N-(4-chlorophenylmethyl)-2- flourophenyl]) squaraine, bis(4-[N-ethyl-N-(4-chlorophenylmethyl)-2- fluorophenyl]) squaraine, bis(4-[N-benzyl-N-(4-chlorophenylmethyl)-2- fluorophenyl]) squaraine and the like.

In one embodiment, the process of the present invention involves mixing from about 1 mole of squaric acid with from about 2 moles to about 3 moles of tertiary aniline derivative and from about 2 liters to about 12 liters of primary alcohol having a boiling point between about 130° C. and about 190° C. This mixture was heated to a temperature of from about 75° C. and about 110° C. with continual stirring at a presssure maintained between about 10 torr and about 43 torr. The reaction mixture was allowed to cool and the desired reaction product was isolated by filtration from the raction mixture. The resulting products had a small praticle size ranging from about 1 micrometer to about 25 micrometers.

The squaraine compositions prepared in accordance with the process of the present invention are useful as photoconductive substances. One embodiment comprises a layered photoresponsive device comprising a supporting substrate, a photoconducting layer comprising squaraine compositions prepared in accordance with the present invention and a charge transport layer. In another embodiment, the photoresponsive device comprises a substrate, a charge transport layer, and a photoconducting layer comprising the squaraine compositions prepared in accordance with the process of the present invention. In still another embodiment, photoresponsive devices useful in printing systems be prepared wherein the devices comprise a layer of the squaraine photoconductive composition prepared in accordance with the process of the present invention, positioned between a photogenerating layer and a hole transport layer or wherein the squaraine photoconductive squaraine composition layer is positioned between a photogenerating layer and a supporting substrate. In the latter devices, the photoconductive layer comprising the squaraine compositions serves to enhance or reduce the intrinsic properties of the photogenerating layer in the infrared and/or visible range of the spectrum.

On specific improved photoresponsive device utilizing the squaraines prepared in accordance with the process of the present invention comprises a supporting substrate; a hole blocking layer; an optional adhesive interface layer; an inorganic photogenerator layer; a photoconductive composition layer comprising the squaraine materials prepared in accordance with the process of the present invention; and a hole transport layer.

The photoresponsive devices described can be prepared by a number of known methods, the process parameters and the order of coating of the layers being dependent on the device desired. Thus, for example, a three layered photoresponsive device can be prepared by vacuum deposition of the photoconducting layer on a supporting substrate and subsequently depositing by the hole transport layer by solution coating. In another process variant, the layered photoresponsive device can be prepared by providing a conductive substrate having a hole blocking layer and an optional adhesive layer, and thereafter applying thereto by solvent coating processes, laminating processes, or other suitable processes, a photoconductive composition comprising the novel squaraines of the present invention.

The improved photoresponsive devices of the present invention can be incorporated into various imaging systems such as conventional xerographic imaging copying and printing systems. Additionally, the improved photoresponsive devices of the present invention containing an inorganic photogenerating layer and a photoconductive layer comprising the squaraines of the present invention can function simultaneously in imaging and printing systems with visible light and/or infrared light. In this embodiment, the improved photoresponsive devices of the present invention may be negatively charged, exposed to light in a wavelength of from about 400 to about 1,000 nanometers, either sequentially or simultaneously, followed by developing the resulting image and transferring the image to paper. The above sequence may be repeated many times.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

Into a three liter three-necked round bottom flask equipped with a mechanical stirrer, thermometer and a condenser with a Dean-Stark trap was placed 28.5 grams squaric acid (0.25 mole), 80 grams N,N-dimethyl aniline (0.66 moles) and 1250 milliliters 1-pentanol. A vacuum of 155 torr was applied via the condenser. The mixture was heated with stirring to reflux at 95° C. The water formed during the course of the reaction was allowed to collect in the Dean-Stark trap. After 24 hours, the reaction was allowed to cool and was filtered. The resulting blue crystalline pigment was washed with methanol and dried in vacuo at 50° C. Yield of bis(4-dimethylaminophenyl) squaraine was 37 grams, 476 percent.

EXAMPLE II

Into a three liter three-necked round bottom flask equipped with a mechanical stirrer, thermometer and a condenser with a Dean-Stark trap was placed 28.5 grams squaric acid (0.25 mole), 80 grams N,N-dimethyl aniline (0.66 mole) and 1250 milliliters 1-heptanol. A vacuum of 155 torr was applied via the condenser. The mixture was heated with stirring to reflux at 95° C. The water formed during the course of the reaction was allowed to collect in the Dean-Stark trap. After 24 hours, the reaction was allowed to cool and was filtered. The resulting blue crystalline pigment was washed with methanol and dried in vacuo at 50° C. Yield of bis(4-dimethylaminophenyl) squaraine was 55 grams, 69 percent.

EXAMPLE III

Into a five liter three-necked round bottom flask equipped with a mechanical stirrer, thermometer and a condenser with a Dean-Stark trap was placed 114 grams squaric acid (1.0 mole), 280 grams N,N-dimethyl aniline (2.3 moles) and 2500 milliliters 1-hexanol. A vacuum of 100 torr was applied via the condenser. The mixture was heated with stirring to reflux at 125° C. The water formed during the course of the reaction was allowed to collect in the Dean-Stark trap. After 12 hours, the reaction was allowed to cool and was filtered. The resulting green crystalline pigment was washed with methanol and dried in vacuo at 50° C. Yield of bis(2-methyl-dimethylaminophenyl) squaraine was 128 grams, 40 percent.

EXAMPLE IV

Into a five liter three-necked round bottom flask equipped with a mechanical stirrer, thermometer and a condenser with a Dean-Stark trap was placed 114 grams squaric acid (1.0 moles), 280 grams N,N-dimethyl aniline (2.3 moles) and 2000 milliliters 1-octanol and 200 milliliters 1-heptanol. A mixture of 1-octanol and 1-heptanol was employed because 1-octanol boils at a temperature slightly above N,N-dimethyl aniline. A vacuum of 36 torr was applied via the condenser. The mixture was heated with stirring to reflux at 100° C. The water formed during the course of the reaction was allowed to collect in the Dean-Stark trap. After 24 hours, the reaction was allowed to cool and was filtered. The resulting blue crystalline pigment was washed with methanol and dried in vacuuo at 50° C. Yield of bis(4-dimethylaminophenyl) squaraine was 204 grams, 64 percent.

EXAMPLE V

Into a three liter three-necked round bottom flask equipped with a mechanical stirrer, thermometer and a condenser with a Dean-Stark trap was placed 28.5 grams squaric acid (0.25 mole), 77 grams N,N-dimethyl-m-toluidine (0.57 mole) and 1250 milliliters 1-heptanol. A vacuum of 47 torr was applied via the condenser. The mixture was heated with stirring to reflux at 105° C. The water formed during the course of the reaction was allowed to collect in the Dean-Stark trap. After 7 hours, the reaction was allowed to cool and was filtered. The resulting green crystalline pigment was washed with methanol and dried in vacuo at 50° C. Yield of bis(2-methyl-dimethylaminophenyl) squaraine was 54 grams, 64 percent.

EXAMPLE VI

Into a five liter three-necked round bottom flask equipped with a mechanical stirrer, thermometer and a condenser with a Dean-Stark trap was placed 114 grams squaric acid (1.0 mole), 296 grams N,N-dimethyl-m-toluidine (2.2 moles) and 1500 milliliters 1-octanol. A vacuum of 36 torr was applied via the condenser. The mixture was heated with stirring to reflux at 100° C. The water formed during the course of the reaction was allowed to collect in the Dean-Stark trap. After 20 hours, the reaction was allowed to cool and was filtered. The resulting green crystalline pigment was washed with methanol and dried in vacuo at 50° C. Yield of bis(2-methyl-dimethylaminophenyl) squaraine was 254 grams, 73 percent.

EXAMPLE VII

Into a 500 milliliter three-necked round bottom flask equipped with a mechanical stirrer, thermometer and a condenser with a Dean-Stark trap was placed 5.7 grams squaric acid (0.05 mole), 14 grams N,N-dimethyl aniline (0.116 mole), 100 milliliters Soltrol 130 ® (a mixture of branched aliphatic hydrocarbons $C_{11}$-$C_{13}$ having a boiling point of approximately 175°-180° C., available from Phillips Chemical Co.) and 13 grams 1-octanol. A vacuum was applied via the condenser and the mixture was heated to reflux at 130° C. for 5 hours. The reaction was cooled and filtered. The resulting blue crystalline pigment was washed with methanol and dried in vacuo at 50° C. Yield of bis(4-dimethylaminophenyl) squaraine was 5.1 grams, 32 percent.

EXAMPLE VIII

Into a five liter three-necked round bottom flask equipped with a mechanical stirrer, thermometer with a gas inlet and a condenser with a Dean-Stark trap was placed 114 grams squaric acid, 280 grams N,N-dimethyl aniline (2.3 moles) and 1200 milliliters n-butanol and 1200 milliliters benzene. While purging with argon, the mixture was heated with stirring to a vigorous reflux. The water formed during the course of the reaction was allowed to collect in the Dean-Stark trap. After 24 hours, the reaction was allowed to cool and was filtered. No pigment was found.

EXAMPLE IX

Into a 1000 liter three-necked round bottom flask equipped with a mechanical stirrer, thermometer and a condenser with a Dean-Stark trap was placed 11.4 grams squaric acid (0.1 mole), 33 grams N,N-dimethyl-3- fluoroaniline (0.24 mole) and 400 milliliters 1-heptanol. A vacuum of 36 torr was applied via the condenser. The mixture was heated with stirring to reflux at 100° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield of bis(2-fluorodimethylaminophenyl) squaraine was 23 grams, 59 percent.

EXAMPLE X

A siloxane layer was formed on an aluminized polyester film, Mylar, in which the aluminum had a thickness of about 150 Angstroms by applying a 0.22 percent (0.001 mole) solution of 3-aminopropyl triethoxylsilane to the aluminum layer with a Bird applicator. The deposited coating was dried in a forced air oven to form a dried coating having a thickness of 200 Angstroms. A coating of polyester resin, du Pont 49000, available from E. I. du Pont de Nemours & Co. was then applied with a Bird applicator to the dried silane layer. The polyester resin coating was dried to form a film having a thickness of about 0.5 micrometer. About 0.075 gram of the squaraine of Example IX was mixed in about 0.15 gram of a binder of Makrolon ®, (polycarbonate resin available from Farbenfabricken Bayer A. G.) and sufficient methylene chloride to form a 15 percent solids mixture. This mixture applied by means of a Bird applicator having a half mil gap to the polyester resin coating to form a coating. After drying in a forced air oven for 5 minutes at temperature of 135° C., the dried coating was found to have a thickness of about 0.5 micrometers. This squaraine generating layer was then overcoated with a charge transport layer containing about 50 percent by weight N,N'-diphenyl-N,N'-bis(3-methylphenyl)-1,1'-biphenyl-4,4'-diamine dispersed in about 50 percent by weight of Makrolon ® (polycarbonate resin available from Farbenfabricken Bayer A.G.). The charge transport layer had a thickness of 32 micron after drying. Electrical evaluation of the resulting coated device charged to about −1000 to −1200 volts revealed a dark decay of about 500+ volts per second. Discharge when exposed to 10 ergs of activating radiation at a wavelength of about 800 nanometers was greater than 60 percent.

EXAMPLE XI

Into a 1000 liter three-necked round bottom flask equipped with a mechanical stirrer, thermometer and a condenser with a Dean-Stark trap was placed 5.7 grams squaric acid (0.05 mole), and 300 milliliters 1-heptanol. A vacuum of 25 Torr was applied via the condenser. The mixture was heated with stirring to reflux at 95° C. for 30 minutes. At this time, all the squaric acid was in solution. The vacuum was broken and 14 grams N,N-dimethylaniline (0.116 mole) was added to the flask. The vacuum was applied and the reaction continued for 20 hours. The mixture was cooled and filtered. The resulting blue crystalline pigment was washed with methanol and dried. Yield of bis(4-dimethylaminophenyl) squaraine was 8.6 grams, 54 percent.

EXAMPLE XII

The procedures and materials of Example X were repeated except that the squaraine of Example II was substituted for the squaraine used in Example X. Electrical evaluation of the resulting coated device charged to about −1000 to −1200 volts revealed a dark decay of about 400 volts per second. Discharge when exposed to 10 ergs of activating radiation at a wavelength of about 800 nanometers was greater than 60 percent.

EXAMPLE XIII

Into a 1000 liter three-necked round bottom flask equipped with a magnetic stirrer, thermometer and a condenser with a Dean-Stark trap was placed 300 milliliters 1-heptanol, 1 milliliter concentrated sulfuric acid (0.019 mole), 5.7 grams squaric acid (0.05 mole) and 14 grams N,N-dimethylaniline (0.116 mole). A vacuum of 25 torr was applied via the condenser. The mixture was heated with stirring to reflux at 95° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield of bis(4-dimethylaminophenyl) squaraine was 10.5 grams, 66 percent.

EXAMPLE XIV

The procedures and materials of Example X were repeated except that the squaraine of Example XIII was substituted for the squaraine used in Example X. Electrical avaluation of the resulting coated device charged to about −1000 to −1200 volts revealed a dark decay of about 80 volts per second. Discharge when exposed to 10 ergs of activating radiation at a wavelength of about 800 nanometers was about 50 percent.

EXAMPLE XV

Into a 1000 liter three-necked round bottom flask equipped with a magnetic stirrer, thermometer and a condenser with a Dean-Stark trap was placed 500 milliliters 1-heptanol, 0.5 milliliter concentrated sulfuric acid (0.0094 mole), 5.7 grams squaric acid (0.05 mole) and 16.6 grams N,N-dimethylamino-3-carboxybenzene (0.1 mole). A vacuum of 20 Torr was applied via the condenser. The mixture was heated with stirring to reflux at 90° C. The water formed during the course of the reaction was allowed to collect in the Dean-Stark trap. After 20 hours, the reactiom was allowed to cool and was filtered. The resulting blue crystalline pigment was washed with methanol and dried in vacuo at 50° C. Yield was 6.5 grams.

| Chemical Anaylysis for C, H, N | | |
|---|---|---|
| Element | Theoretical | Found |
| C | 64.7% | 74.8% |
| H | 4.9% | 6.6% |
| N | 6.8% | 8.5% |

EXAMPLE XVI

The procedures and materials of Example X were repeated except that the squaraine of Example XV was substituted for the squaraine used in Example X. Electrical evaluation of the resulting coated device charged to about −1000 to −1200 volts revealed a dark decay of about 80 volts per second. Discharge when exposed to 10 ergs of activating radiation at a wavelength of about 800 nanometers was about 50 percent.

EXAMPLE XVII

Into a 1000 liter three-necked round bottom flask equipped with a magnetic stirrer, thermometer and a condenser with a Dean-Stark trap was place 400 milliliters 1-heptanol, 0.5 milliliter concentrated sulfuric acid (0.0094 mole), 5.7 grams squaric acid (0.05 mole) and 15 grams N,N-dimethylamino-3-fluorobenzene (0.11 mole). A vacuum of 20 torr was applied via the condenser. The mixture was heated with stirring to reflux at 95° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield was 9.1 grams.

| Chemical Analysis for C, H, N, F | | |
|---|---|---|
| Element | Theoretical | Found |
| C | 67.4% | 73.3% |
| H | 5.1% | 6.2% |
| N | 7.9% | 8.5% |
| F | 10.7% | 2.3% |

EXAMPLE XVIII

The procedures and materials of Example X were repeated except that the squaraine of Example XVIII was substituted for the squaraine used in Example X. Electrical evaluation of the resulting coated device charged to about −1000 to −1200 volts revealed a dark decay of about 120 volts per second. Discharge when exposed to 10 ergs of activating radiation at a wavelength of about 800 nanometers was about 50 percent.

EXAMPLE XIX

Into a 1000 liter three-necked round bottom flask equipped with a magnetic stirrer, thermometer and a condenser with a Dean-Stark trap was placed 300 milliliters 1-heptanol, 0.3 milliliter concentrated sulfuric acid (0.0056 mole), 4 grams of squaric acid (0.035 mole) and 11.3 grams N,N-dimethylamino-3-chlorobenzene (0.073 mole). A vacuum of 36 Torr was applied via the condenser. The mixture was heated with stirring to reflux at 100° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield was 3.2 grams.

| Chemical Analysis for C, H, N, Cl | | |
|---|---|---|
| Element | Theoretical | Found |
| C | 61.7% | 71.9% |
| H | 4.7% | 6.0% |
| N | 7.2% | 8.3% |
| Cl | 18.2% | 1.9% |

EXAMPLE XX

The procedures and materials of Example X were repeated except that the squaraine of Example XIX was substituted for the squaraine used in Example X. Electrical evaluation of the resulting coated device charged to about −1000 to −1200 volts revealed a dark decay of about 80 volts per second. Discharge when exposed to 10 ergs of activating radiation at a wavelength of about 800 nanometers was about 75 percent.

EXAMPLE XXI

Into a three liter three-necked round bottom flask equipped with a mechanical stirrer, thermometer and a condenser with a Dean-Stark trap was placed 28.5 grams squaric acid (0.25 mole), 80 grams N,N-dimethyl aniline (0.66 moles), 1250 milliliters 1-pentanol and 0.1 milliliter concentrated sulfuric acid (0.019 mole). A vacuum of 25 torr was applied via the condenser. The mixture was heated with stirring to reflux at 95° C. The water formed during the course of the reaction was allowed to collect in the Dean-Stark trap. After 24 hours, the reactim was allowed to cool and was filtered. The resulting blue crystalline pigment was washed with methanol and dried in vacuo at 50° C. Yield of bis(4-dimethylaminophenyl) squaraine was 10.9 grams, 69 percent.

EXAMPLE XXII

The procedures and materials of Example X were repeated except that the squaraine of Example XXI was substituted for the squaraine used in Example X. Electrical evaluation of the resulting coated device charged to about −1000 to −1200 volts revealed a dark decay of about 200 volts per second. Discharge when exposed to 10 ergs of activating radiation at a wavelength of about 800 nanometers was about 45 percent.

EXAMPLE XXIII

Into a three liter three-necked round bottom flask equipped with a mechanical stirrer, thermometer and a condenser with a Dean-Stark trap was placed 28.5 grams squaric acid (0.25 mole), 80 grams N,N-dimethyl aniline (0.66 moles), 500 milliliters 2-ethyl-1-hexanol and 0.3 milliliter concentrated sulfuric acid (0.0056 mole). A vacuum of 25 torr was applied via the condenser. The mixture was heated with stirring to reflux at 95° C. The water formed during the course of the reaction was allowed to collect in the Dean-Stark trap. After 24 hours, the reaction was allowed to cool and was filtered. The resulting blue crystalline pigment was washed with methanol and dried in vacuo at 50° C. Yield of bis(4-dimethylaminophenyl) squaraine was 11.8 grams, 74 percent.

EXAMPLE XXIV

The procedures and materials of Example X were repeated except that the squaraine of Example XXIII was substituted for the squaraine used in Example X. Electrical evaluation of the resulting coated device charged to about −1000 to −1200 volts revealed a dark decay of about 80 volts per second. Discharge when exposed to 10 ergs of activating radiation at a wavelength of about 800 nanometers was about 50 percent.

EXAMPLE XXV

Into a 1000 liter three-necked round bottom flask equipped with a magnetic stirrer, thermometer and a condenser with a Dean-Stark trap was placed 300 milliliters 1-heptanol, 0.3 milliliter concentrated sulfuric acid (0.0056 mole), 4,5 grams squaric acid (0.039 mole) and 16 grams N,N-dimethylamino-2-alpha,alpha,alpha-trifluoromethylbenzene (0.085 mole). A vacuum of 36 torr was applied via the condenser. The mixture was heated with stirring to reflux at 100° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield was 9.4 grams, 53 percent.

| Chemical Analysis for C, H, N, F | | |
|---|---|---|
| Element | Theoretical | Found |
| C | 57.9% | 74.8% |
| H | 4.0% | 6.3% |
| N | 6.1% | 8.7% |
| F | 25.0% | 0.15% |

EXAMPLE XXVI

The procedures and materials of Example X were repeated except that the squaraine of Example XXV was substituted for the squaraine used in Example X. Electrical evaluation of the resulting coated device charged to about −1000 to −1200 volts revealed a dark decay of about 80 volts per second. Discharge when exposed to 10 ergs of activating radiation at a wavelength of about 800 nanometers was about 50 percent.

EXAMPLE XXVII

Into a 1000 liter three-necked round bottom flask equipped with a magnetic stirrer, thermometer and a condenser with a Dean-Stark trap was placed 300 milliliters 1-heptanol, 0.4 milliliter concentrated sulfuric acid (0.0075 mole), 5.7 grams squaric acid (0.05 mole) and 24.5 grams triphenylamine (0.1 mole). A vacuum of 36 torr was applied via the condenser. The mixture was heated with stirring to reflux at 100° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield was 0.1 gram.

EXAMPLE XXVIII

Into a 1000 liter three-necked round bottom flask equipped with a magnetic stirrer, thermometer and a condenser with a Dean-Stark trap was placed 2.8 grams squaric acid (0.025 mole), 200 milliliters 1-heptanol, 0.75 grams monochloroacetic acid (0.008 mole) and 8 grams N,N-dimethylamino-3-chlorobenzene (0.052 mole). A vacuum of 14 torr was applied via the condenser. The mixture was heated with stirring to reflux at 85° C. The water formed during the course of the reaction was allowed to collect in the Dean-Stark trap. After 24 hours, the reaction was allowed to cool and was filtered. The resulting blue crystalline pigment was washed with methanol and dried in vacuuo at 50° C. Yield was 0.6 grams.

EXAMPLE XXIX

The procedures and materials of Example X were repeated except that the squaraine of Example XXVIII was substituted for the squaraine used in Example X. Electrical evaluation of the resulting coated device charged to about −1000 to −1200 volts revealed a dark decay of about 40 volts per second. Discharge when exposed to 10 ergs of activating radiation at a wavelength of about 800 nanometers was about 50 percent.

EXAMPLE XXX

Into a 1000 liter three-necked round bottom flask equipped with a magnetic stirrer, thermometer and a condenser with a Dean-Stark trap was placed 2.8 grams squaric acid (0.025 mole), 200 milliliters 1-heptanol, 0.35 gram oxalic acid (0.0028 mole) and 8 grams N,N-dimethylamino-3-chlorobenzene (0.052 mole). A vacuum of 25 Torr was applied via the condenser. The mixture was heated with stirring to reflux at 95° C. The water formed during the course of the reaction was allowed to collect in the Dean-Stark trap. After 24 hours, the reaction was allowed to cool and was filtered. The resulting blue crystalline pigment was washed with methanol and dried in vacuuo at 50° C. Yield was 0.3 grams.

EXAMPLE XXXI

The procedures and materials of Example X were repeated except that the squaraine of Example XXX was substituted for the squaraine used in Example X. Electrical evaluation of the resulting coated device charged to about −1000 to −1200 volts revealed a dark decay of about 120 volts per second. Discharge when exposed to 10 ergs of activating radiation at a wavelength of about 800 nanometers was about 55 percent.

EXAMPLE XXXII

Into a 1000 liter three-necked round bottom flask equipped with a magnetic stirrer, thermometer and a condenser with a Dean-Stark trap was placed 2.8 grams squaric acid (0.025 mole), 200 milliliters 1-heptanol, and 8 grams N,N-dimethylamino-3-chlorobenzene (0.052 mole). A vacuum of 14 torr was applied via the condenser. The mixture was heated with stirring to reflux at 85° C. Any water formed during reflux was allowed to collect in the Dean-Stark trap. After 24 hours, the mixture was allowed to cool and was filtered. No yield was observed. In comparing results of this example with the results of Example XXVIII and Example XXIX, it is apparent that the presence of a strong acid is desirable under the reaction conditions employed.

Although the invention has been described with reference to specific preferred embodiments, it is not intended to be limited thereto, rather those skilled in the art will recognize that variations and modifications may be made therein which are within the spirit of the present invention and within the scope of the following claims.

I claim:

1. A process for synthesizing a squaraine composition comprising forming a mixture comprising squaric acid, a primary alcohol having a boiling point at atmospheric pressure between about 130° C. and about 210° C. and a tertiary amine and heating said mixture in vacuo below the boiling points of said primary alcohol and said tertiary amine to form said squaraine composition.

2. A process for synthesizing squaraines according to claim 1 including heating said mixture in vacuo to a temperature between about 60° C. and about 130° C.

3. A process for synthesizing squaraines according to claim 2 wherein the pressure is maintained between about 5 torr and about 200 torr.

4. A process for synthesizing squaraines according to claim 1 wherein said long chain aliphatic alcohol has a boiling point between about 170° C. and about 185° C.

5. A process for synthesizing squaraines according to claim 3 wherein said long chain aliphatic alcohol is selected from the group consisting of 1-heptatanol and 2-ethyl-1-hexanol.

6. A process for synthesizing squaraines according to claim 1 including introducing a strong acid to said mixture prior to said heating of said solution.

7. A process for synthesizing squaraines according to claim 5 wherein said strong acid is sulfuric acid.

8. A process for synthesizing squaraines according to claim 1 wherein said mixture comprises about one mole of said squaric acid and about 2 to about 2.4 moles of said tertiary amine.

9. A process for synthesizing squaraines according to claim 1 including refluxing said mixture during said heating and removing water formed during formation of said squaraine composition.

10. A process for synthesizing squaraines according to claim 1 wherein said tertiary amine is a tertiary aniline derivative having the formula:

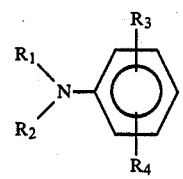

wherein $R_1$ and $R_2$ are independently selected from the group consisting of an alkyl radical having from 1 to 4 carbon atoms, phenyl, benzyl and substituted benzyl derivatives, and $R_3$ and $R_4$ are independently selected from the group consisting of H, $CH_3$, $CH_2CH_3$, $CF_3$, F, Cl, Br and COOH.

* * * * *